US012792570B1

(12) United States Patent
Koppoju et al.

(10) Patent No.: US 12,792,570 B1
(45) Date of Patent: Nov. 10, 2026

(54) SYSTEM, METHOD, AND COMPUTER PROGRAM FOR OPTIMIZED KAFKA TOPIC STORAGE

(71) Applicant: Amdocs Development Limited, Limassol (CY)

(72) Inventors: Harekrishna Koppoju, Pune (IN); Ranit Mathur, Pune (IN)

(73) Assignee: AMDOCS DEVELOPMENT LIMITED

( * ) Notice: Subject to any disclaimer, the term of this patent is extended or adjusted under 35 U.S.C. 154(b) by 0 days.

(21) Appl. No.: 18/986,568

(22) Filed: Dec. 18, 2024

(51) Int. Cl.

| | |
|---|---|
| ***G06F 16/21*** | (2019.01) |
| ***G06F 16/174*** | (2019.01) |
| ***G06F 16/2453*** | (2019.01) |
| ***G06F 16/28*** | (2019.01) |

(52) U.S. Cl.
CPC ........ *G06F 16/1744* (2019.01); *G06F 16/284* (2019.01)

(58) Field of Classification Search
CPC ........................... G06F 16/1744; G06F 16/284
USPC ........................................................ 707/693
See application file for complete search history.

(56) References Cited

U.S. PATENT DOCUMENTS

2021/0051216 A1* 2/2021 Shoji ........................ H04L 69/22
2026/0123620 A1* 5/2026 Reyntjens ............. A01M 3/007

FOREIGN PATENT DOCUMENTS

CN 115687466 A * 2/2023
CN 117278378 A * 12/2023 ........... H04L 41/026
WO WO-2021101798 A1 * 5/2021 ............. G06F 16/13

OTHER PUBLICATIONS

KafkaTDS: "Apache KafkaÂ® Transaction Data Streaming", (Confluent & Attunity Special Edition, by Thornton J. Craig, Kevein Petrie, Tim Berglund, John Wiley & Sons, Inc., 2020) (Year: 2020).*

* cited by examiner

*Primary Examiner* — Kuen S Lu
(74) *Attorney, Agent, or Firm* — Zilka-Kotab, P.C.

(57) ABSTRACT

As described herein, a system, method, and computer program are provided for optimizing Kafka topic storage. Data to be published to a Kafka topic is received from a producer process. The data is stored as sparse data in a sparse data structure. The sparse data is serialized to generate a binary representation of the data. The binary representation of the data is compressed to generate a compressed representation of the data. The compressed representation of the data is stored to the Kafka topic.

6 Claims, 16 Drawing Sheets json Copy code

Figure 4A:
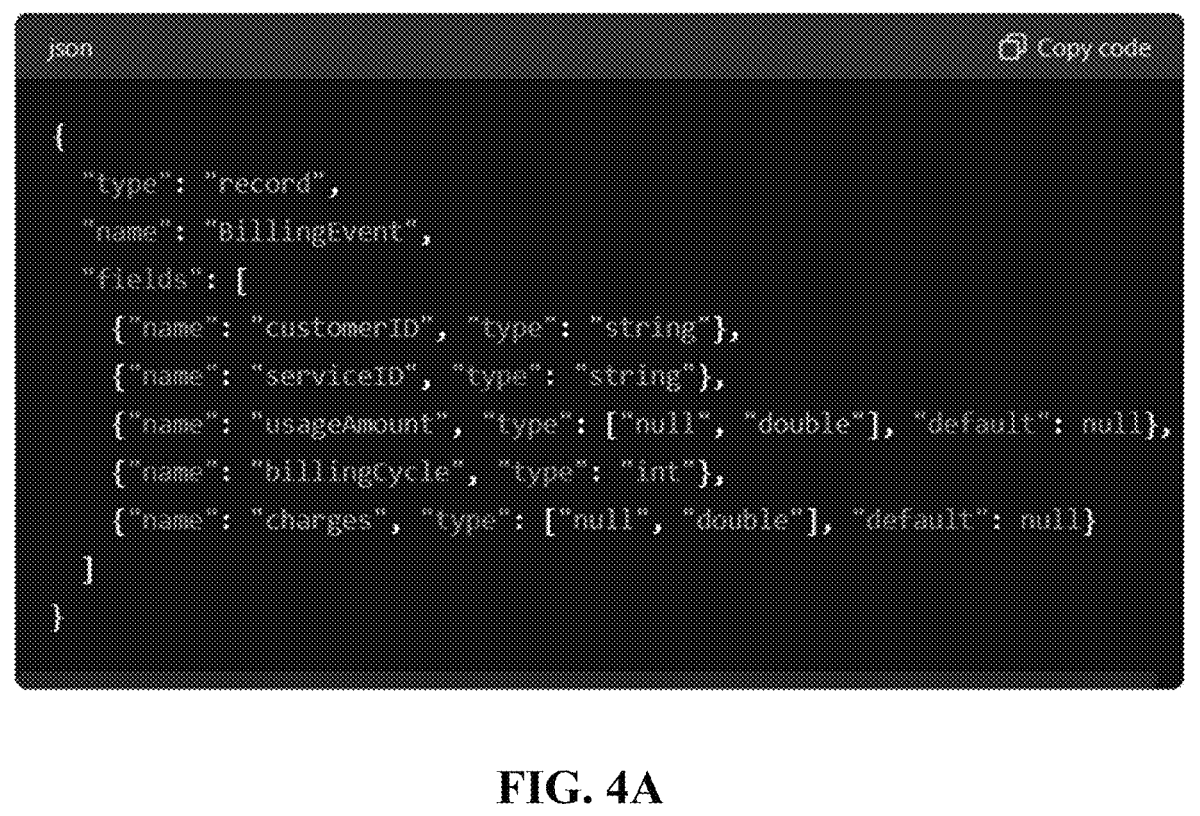

```json
{
  "type": "record",
  "name": "BillingEvent",
  "fields": [
    {"name": "customerID", "type": "string"},
    {"name": "serviceID", "type": "string"},
    {"name": "usageAmount", "type": ["null", "double"], "default": null},
    {"name": "billingCycle", "type": "int"},
    {"name": "charges", "type": ["null", "double"], "default": null}
  ]
}
```

FIG. 4A json Copy code

```json
{
  "customerID": "C12345",
  "serviceID": "S12345",
  "usageAmount": null,
  "billingCycle": 12,
  "charges": null
}
```

FIG. 4B json Copy code

```json
{
  "customerID": "C12345",
  "serviceID": "S12345",
  "billingCycle": 12
}
```

FIG. 4C

```python
import avro.schema
import avro.io
import io

schema = avro.schema.parse(open("billing_event.avsc", "rb").read())

def serialize_avro(data, schema):
    writer = avro.io.DatumWriter(schema)
    bytes_writer = io.BytesIO()
    encoder = avro.io.BinaryEncoder(bytes_writer)
    writer.write(data, encoder)
    return bytes_writer.getvalue()

sparse_data = {
    "customerID": "C12345",
    "serviceID": "S12345",
    "billingCycle": 12
}

serialized_data = serialize_avro(sparse_data, schema)
```

FIG. 4D

```python
import gzip

def compress_data(data):
    return gzip.compress(data)

compressed_data = compress_data(serialized_data)
```

FIG. 4E python Copy code

```python
from confluent_kafka import Producer

conf = {'bootstrap.servers': "localhost:9092"}
producer = Producer(conf)

def delivery_report(err, msg):
    if err is not None:
        print('Message delivery failed: {}'.format(err))
    else:
        print('Message delivered to {} [{}]'.format(msg.topic(), msg.parti

producer.produce('billing_events', key='key', value=compressed_data, callb
producer.flush()
```

FIG. 4F python Copy code

```python
from confluent_kafka import Producer

conf = {'bootstrap.servers': "localhost:9092"}
producer = Producer(conf)

def delivery_report(err, msg):
    if err is not None:
        print('Message delivery failed: {}'.format(err))
    else:
        print('Message delivered to {} [{}]'.format(msg.topic(), msg.parti

producer.produce('billing_events', key='key', value=compressed_data, callb
producer.flush()
```

FIG. 4G python Copy code

```python
import gzip
import avro.io
import avro.schema
import io

def decompress_data(data):
    return gzip.decompress(data)

def deserialize_avro(data, schema):
    bytes_reader = io.BytesIO(data)
    decoder = avro.io.BinaryDecoder(bytes_reader)
    reader = avro.io.DatumReader(schema)
    return reader.read(decoder)

compressed_data = # Retrieve compressed data from Kafka
decompressed_data = decompress_data(compressed_data)
original_data = deserialize_avro(decompressed_data, schema)
```

FIG. 4H json Copy code

```json
{
  "type": "record",
  "name": "User",
  "fields": [
    {"name": "userID", "type": "int"},
    {"name": "userName", "type": "string"},
    {"name": "isActive", "type": ["null", "boolean"], "default": null}
  ]
}
```

FIG. 4I json Copy code

```json
{
  "type": "record",
  "name": "Order",
  "fields": [
    {"name": "orderID", "type": "int"},
    {
      "name": "status",
      "type": {
        "type": "enum",
        "name": "OrderStatus",
        "symbols": ["PENDING", "PROCESSING", "SHIPPED", "DELIVERED"]
      }
    }
  ]
}
```

FIG. 4J json Copy code

```json
{
  "type": "record",
  "name": "UserProfile",
  "fields": [
    {"name": "userID", "type": "int"},
    {"name": "tags", "type": {"type": "array", "items": "string"}}
  ]
}
```

FIG. 4K json Copy code

```json
{
  "type": "record",
  "name": "Product",
  "fields": [
    {"name": "productID", "type": "int"},
    {"name": "attributes", "type": {"type": "map", "values": "string"}}
  ]
}
```

FIG. 4L json Copy code

```json
{
  "type": "record",
  "name": "Event",
  "fields": [
    {"name": "eventID", "type": "int"},
    {"name": "eventData", "type": ["null", "string", "int"], "default": nu
  ]
}
```

FIG. 4M json Copy code

```json
{
  "type": "record",
  "name": "User",
  "fields": [
    {"name": "userID", "type": "int"},
    {
      "name": "address",
      "type": {
        "type": "record",
        "name": "Address",
        "fields": [
          {"name": "street", "type": "string"},
          {"name": "city", "type": ["null", "string"], "default": null}
        ]
      }
    }
  ]
}
```

FIG. 4N

```
{
  "type": "record",
  "name": "BillingEvent",
  "fields": [
    {"name": "CustomerID", "type": "int"},
    {"name": "ServiceID", "type": ["null", "string"], "default": null},
    {"name": "UsageAmount", "type": ["null", "int"], "default": null},
    {"name": "BillingCycle", "type": "string"},
    {"name": "Charges", "type": ["null", "int"], "default": null},
    {"name": "Discount", "type": ["null", "int"], "default": null},
    {"name": "Remarks", "type": ["null", "string"], "default": null}
  ]
}
```

FIG. 4O json Copy code

```json
// Before serialization
{
  "CustomerID": 1001,
  "ServiceID": "S101",
  "UsageAmount": 500,
  "BillingCycle": "Q1-2024",
  "Charges": 100
}

// Serialized binary data (example, not actual output)
0x01 0x02 0x03 0x04 0x05

// After compression (example, not actual output)
0x1F 0x8B 0x08 0x00 0x00 0x00 0x00 0x00 0x02 0x03
```

FIG. 4P json Copy code

```json
{
  "topic": "billing-events",
  "partitions": 3,
  "replication-factor": 2
}
```

FIG. 4Q json Copy code

```json
// Compressed binary data (example, not actual output)
0x1F 0x8B 0x08 0x00 0x00 0x00 0x00 0x00 0x02 0x03

// After decompression (example, not actual output)
0x01 0x02 0x03 0x04 0x05

// Deserialized data
{
  "CustomerID": 1001,
  "ServiceID": "S101",
  "UsageAmount": 500,
  "BillingCycle": "Q1-2024",
  "Charges": 100
}
```

FIG. 4R

SYSTEM, METHOD, AND COMPUTER PROGRAM FOR OPTIMIZED KAFKA TOPIC STORAGE

FIELD OF THE INVENTION

The present invention relates to data storage.

BACKGROUND

Efficient data storage is crucial in today's digital era, where the volume of data generated is growing exponentially. Organizations rely on massive amounts of data to drive decision-making, improve operational efficiency, and provide personalized customer experiences. However, managing and storing this data effectively poses significant challenges. Inefficient data storage can lead to increased costs, slower data retrieval times, and reduced overall system performance. Therefore, developing innovative solutions to optimize data storage is imperative for businesses aiming to maintain a competitive edge.

Kafka, an open-source distributed event streaming platform, plays a pivotal role in modern data architectures. It is designed to handle real-time data feeds and enables organizations to build robust data pipelines that can process and analyze data streams efficiently. Kafka's architecture is based on the publish-subscribe messaging pattern, where producers publish messages to topics and consumers subscribe to those topics to receive the messages.

For some business entities, Kafka is integral to the architecture for numerous internal and external data processing and interactions. Kafka can be leveraged to support real-time data streaming, which is essential for delivering timely insights and enhancing the performance of data-driven operations. Kafka's ability to handle high-throughput, low-latency data streams makes it an ideal choice for various applications, including Customer Care and Billing (CCB), Customer Experience Suite, Service Monetization, Network Optimization, and Revenue Guard.

However, traditional Kafka topic storage methods often lead to significant inefficiencies, particularly when dealing with large volumes of data. These inefficiencies stem from the way Kafka stores messages. Each message in Kafka is a key-value pair, where the key is optional, and the value is the actual data payload. When dealing with complex data structures that include many optional or default fields, the traditional storage methods record all fields, even if they are null or hold default values. This practice results in substantial storage overhead. For example, in scenarios where data structures contain many optional fields that are frequently null, storing these null values consumes unnecessary storage space. Furthermore, default values that are consistently the same across many records contribute to redundant data, exacerbating storage inefficiencies.

There is thus a need for addressing these and/or other issues associated with the prior art. For example, there is a need to optimize Kafka topic storage which can reduce storage overheads.

SUMMARY

As described herein, a system, method, and computer program are provided for optimizing Kafka topic storage. In an embodiment, data to be published to a Kafka topic is received from a producer process. The data is stored as sparse data in a sparse data structure. The sparse data is serialized to generate a binary representation of the data. The binary representation of the data is compressed to generate a compressed representation of the data. The compressed representation of the data is stored to the Kafka topic.

In another embodiment, a compressed representation of data is retrieved from a Kafka topic. The compressed representation of the data is decompressed to obtain a binary representation of the data. The binary representation of the data is deserialized to obtain sparse data stored in a sparse data structure. The sparse data is converted to a non-sparse format to obtain the data. The data is returned to a consumer process.

BRIEF DESCRIPTION OF THE DRAWINGS

FIGS. 4A-4R illustrate an implementation of the Kafka system, in accordance with one embodiment.

DETAILED DESCRIPTION

Figure 1:
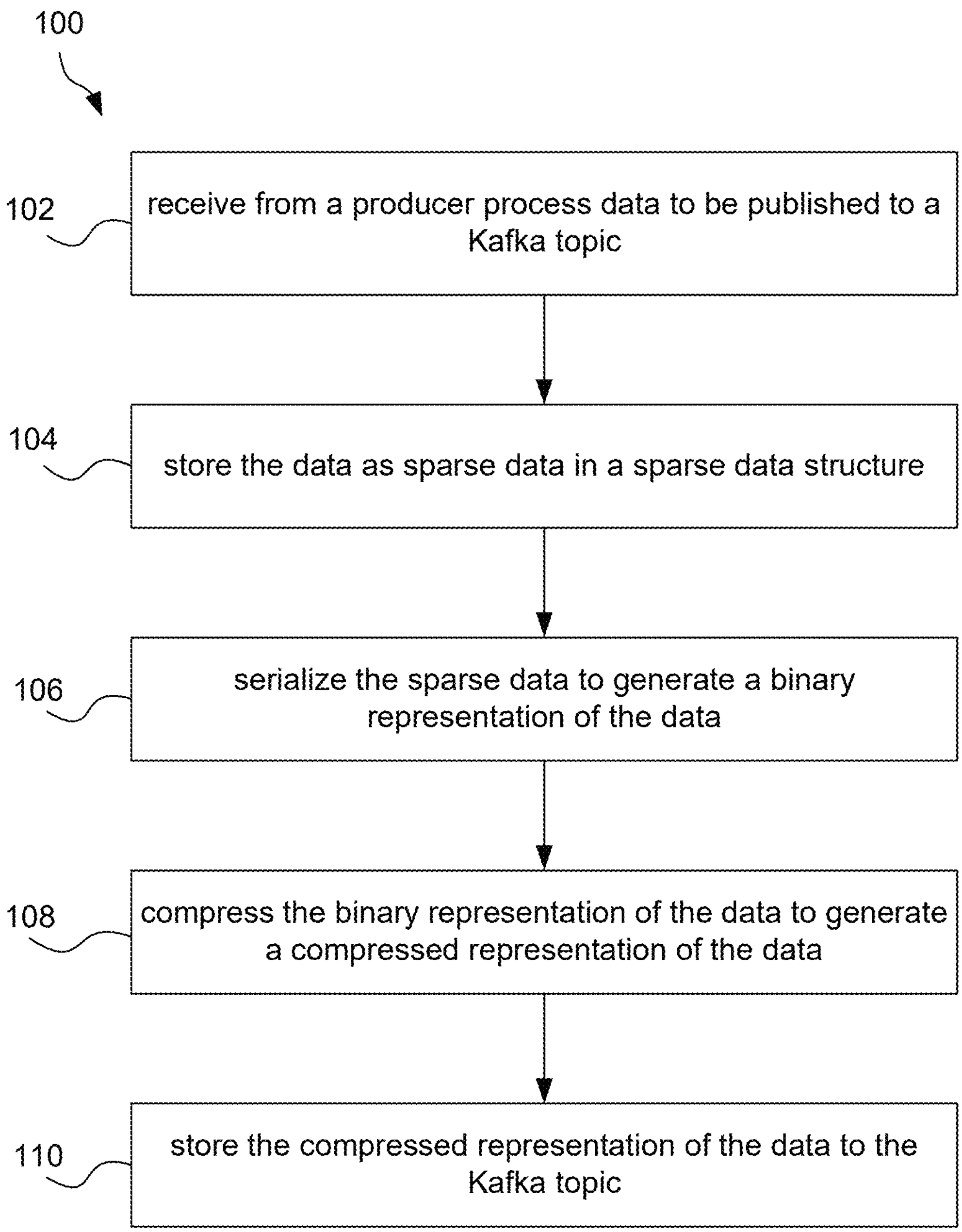
FIG. 1 illustrates a method for compressing data for storage to a Kafka topic, in accordance with one embodiment.

FIG. 1 illustrates a method 100 for compressing data for storage to a Kafka topic, in accordance with one embodiment. The method 100 may be carried out by a computer system, such as that described below with respect to FIGS. 5 and/or 5.

In operation 102, data to be published to a Kafka topic is received from a producer process. The data refers to any formatted data published to the Kafka topic by the producer process. In an embodiment, the data includes a stream of data records. In an embodiment, each record in the stream of data records may have a same format (i.e. the same fields).

In operation 104, the data is stored as sparse data in a sparse data structure. Sparse data refers to data with a lower dimension that its non-sparse counterpart. In an embodiment, storing the data as sparse data may include removing null values and/or default values from the data and storing a result in the sparse data structure.

In operation 106, the sparse data is serialized to generate a binary representation of the data. Serializing refers to converting the sparse data to a series of bits or bytes. In an embodiment, serializing the sparse data may include converting the sparse data structure into a compact binary format. In an embodiment, the sparse data may be serialized using a serialization library which processes the sparse data and a defined schema to generate the binary representation of the data.

In operation 108, the binary representation of the data is compressed to generate a compressed representation of the data. Compressing refers to reducing a size of the binary representation of the data via a predefined algorithm or process. In an embodiment, the binary representation may be compressed using a predefined compression algorithm. In an embodiment, compressing the binary representation may include removing redundant data from the binary representation. In an embodiment, compressing the binary representation may include encoding the binary representation of the data.

In operation 110, the compressed representation of the data is stored to the Kafka topic. In an embodiment, storing the compressed representation of the data to the Kafka topic may include storing the compressed representation of the data to a logical channel associated with the Kafka topic. In an embodiment, storing the compressed representation of the data to the Kafka topic may include producing messages to the Kafka topic, wherein the messages contain the compressed representation of the data. In an embodiment, the messages may be written to one or more partitions associated with the Kafka topic.

To this end, the method 100 can be performed to optimize data for storage to a Kafka topic, in particular by compressing the data for storage to the Kafka topic. This may improve Kafka storage efficiency, reduce Kafka storage cost, and improve Kafka performance by reducing data transmission and retrieval times, while still maintaining data integrity by preserving the original data structure and values for decompression (e.g. per the method 200 of FIG. 2 described below).

Figure 2:
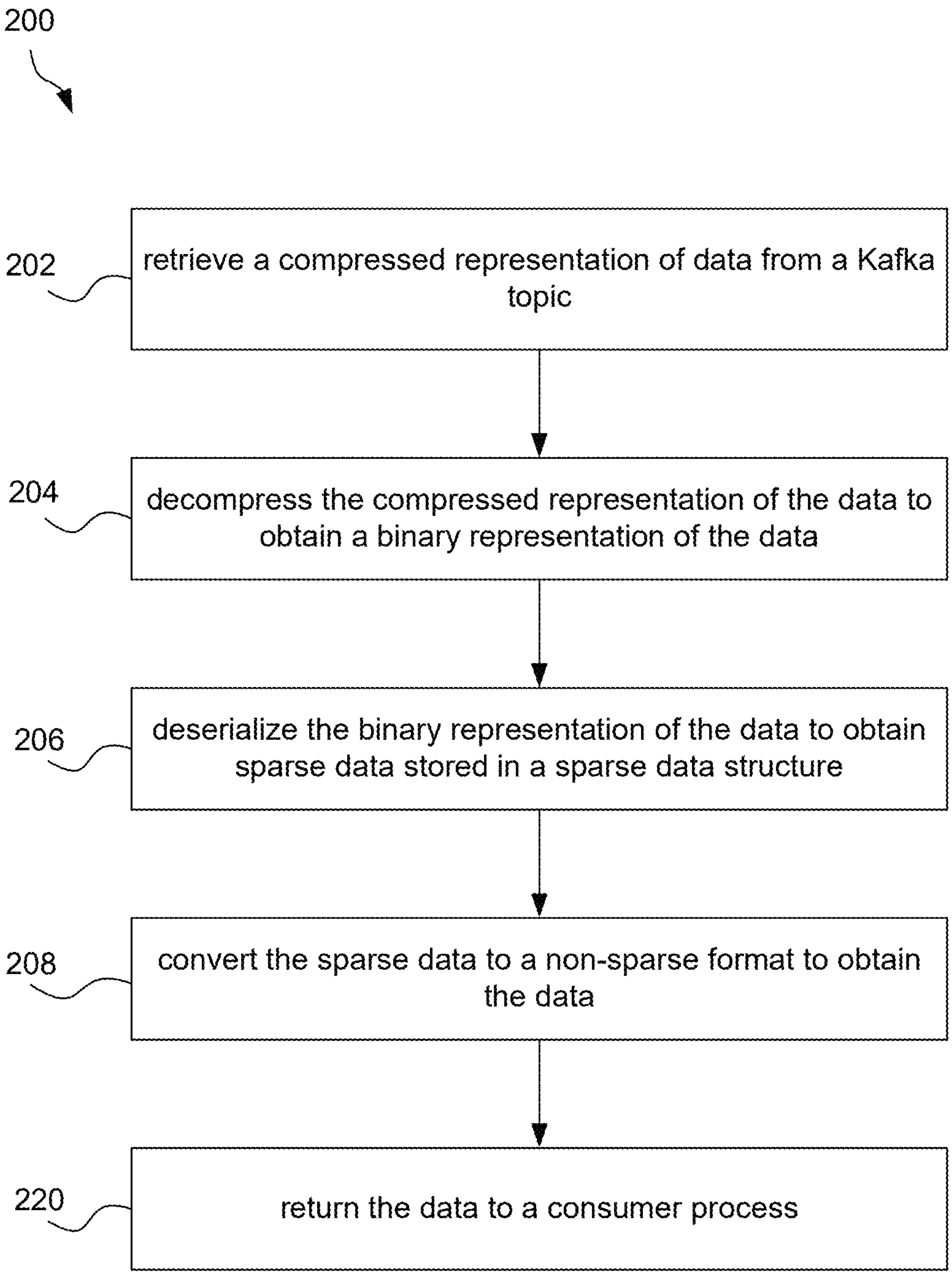
FIG. 2 illustrates a method for decompressing data stored to a Kafka topic, in accordance with one embodiment.

FIG. 2 illustrates a method 200 for decompressing data stored to a Kafka topic, in accordance with one embodiment. The method 200 may be performed with respect to the compressed data stored to the Kafka topic as described in the method 100 of FIG. 1. Thus the definitions and embodiments provided above may equally apply to the present description.

In operation 202, a compressed representation of data is retrieved from a Kafka topic. In an embodiment, retrieving the compressed representation of the data from the Kafka topic may include retrieving from the Kafka topic messages containing the compressed representation of the data. In an embodiment, the messages may be retrieved from one or more partitions associated with the Kafka topic.

In operation 204, the compressed representation of the data is decompressed to obtain a binary representation of the data. In an embodiment, the compressed representation may be decompressed using a predefined decompression algorithm. In an embodiment, decompressing the compressed representation of the data may include adding redundant data back to the binary representation of the data.

In operation 206, the binary representation of the data is deserialized to obtain sparse data stored in a sparse data structure. In an embodiment, deserializing the binary representation of the data may include converting a compact binary format of the binary representation of the data to the sparse data structure.

In operation 208, the sparse data is converted to a non-sparse format to obtain the data. In an embodiment, converting the sparse data to the non-sparse format may include filling in missing null values and missing default values as specified in a defined schema.

In operation 210, the data is returned to a consumer process. In an embodiment, the data may include a stream of data records. In an embodiment, the data may include an original data structure and values as that initially received by a producer process for storage to the Kafka topic.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
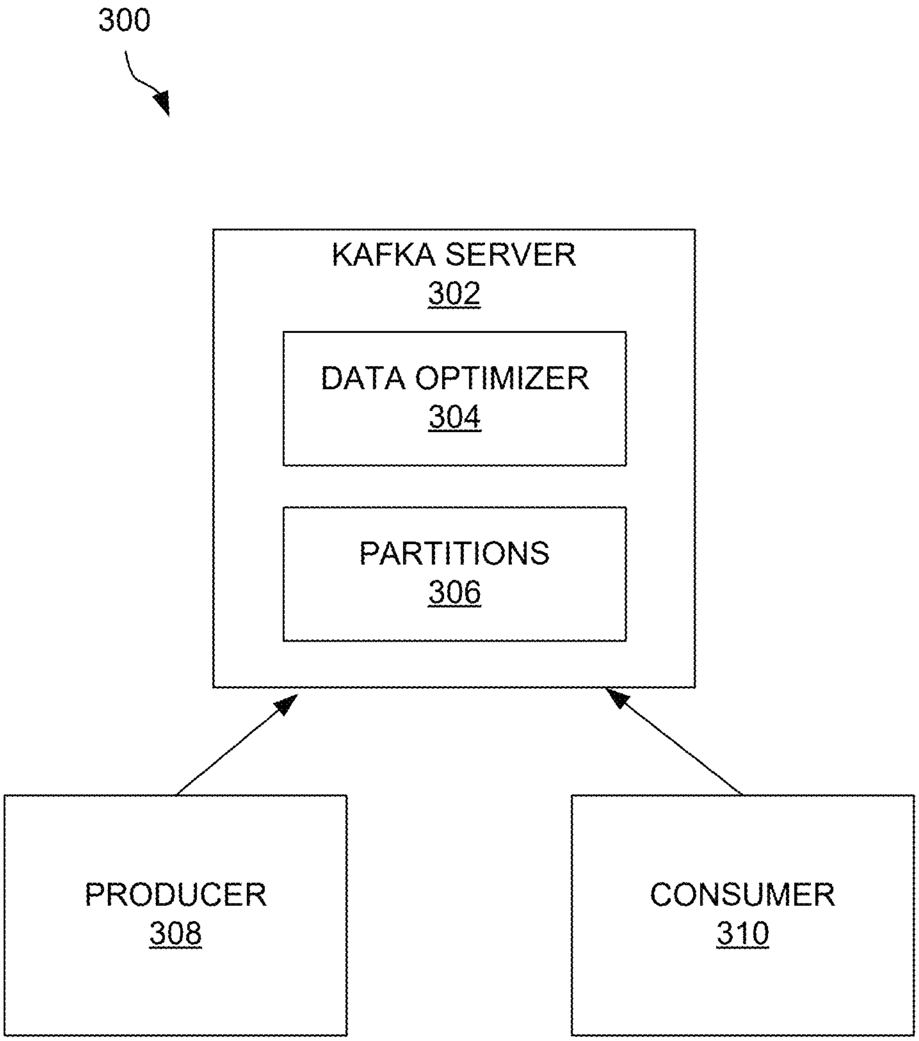
FIG. 3 illustrates a Kafka system, in accordance with one embodiment.

FIG. 3 illustrates a Kafka system 300, in accordance with one embodiment. As an option, the Kafka system 300 may be implemented in the context of the details of the previous figure and/or any subsequent figure(s). Of course, however, the Kafka system 300 may be implemented in the context of any desired environment. Further, the aforementioned definitions may equally apply to the description below.

As shown, the Kafka system 300 includes a Kafka server 302 and at least one producer process 308 and at least one consumer process 310. The Kafka system 300 receives data from the producer process(es) 308 for storage to one or more Kafka topics, optimizes the data using a data optimizer 304, stores the optimized data to partitions associated with the Kafka topic(s), and then processes the optimized data using the data optimizer 304 in order to return the original data to the consumer process(es) 310.

Optimizing (Compressing) Data from a Producer Process 308

Initially, raw data from an producer process is received by the data optimizer 304 for storage to a Kafka topic. The data optimizer 304 defines an Avro schema with optional fields to ensure flexible and efficient data representation.

Apache Avro is a data serialization framework developed within the Apache Hadoop project. It provides a compact, fast, binary data format, rich data structure definitions, and a container file for storing persistent data. Avro is particularly advantageous due to its support for schema evolution, meaning schemas can evolve over time without breaking compatibility with older data.

Defining an Avro schema involves specifying the structure of the data in a JSON format. The schema includes various data types such as strings, integers, arrays, maps, and unions. Optional fields are specified using a union type that includes "null" as one of the types. This allows fields to be absent or contain a null value, making the schema flexible.

FIG. 4A illustrates an exemplary Avro schema that defines a record with five fields: customerID, serviceID, usageAmount, billingCycle, and charges. The usageAmount and charges fields are optional and can be null.

The data optimizer 304 designs a sparse data structure to eliminate null and default values from the raw data.

The sparse data structure is designed to store only non-null and non-default values. This is particularly useful in scenarios where many fields in the data structure are optional and frequently null. By storing only the essential data, the sparse structure will reduce the overall data size and improve storage efficiency.

Enhancing the sparse structure can provide: (1) Advanced Storage Efficiency: By selectively storing non-null and non-default values, the system drastically reduces data redundancy, significantly lowering storage costs. This approach is particularly effective in environments with massive data streams, such as real-time analytics platforms. (2) Enhanced Performance: The reduced data size directly improves data transmission speeds and retrieval times, making the system particularly suitable for high-throughput environments. Optimized indexing and quicker access methods are employed to further enhance data retrieval efficiency. (3) Increased Cost Savings: The substantial reduction in data storage not only translates to direct cost savings but also optimizes resource allocation, making the system economically viable in both on-premises and cloud environments.

FIG. 4B illustrates an original record of the raw data and FIG. 4C illustrates a sparse record generated from sparsification of the original record. In the sparse record, only the non-null fields (customerID, serviceID, billingCycle) are stored.

The data optimizer 304 implements a specialized Avro serialization process that integrates directly with the sparse data structure. This integration provides optimized memory utilization, transactional guarantees, and efficient binary encoding while maintaining schema evolution capabilities.

The serialization process employs a custom Avro encoder that: (1) Maintains bidirectional mapping between sparse structures and binary format, (2) Implements efficient memory management through buffer pooling, (3) Provides transactional integrity during transformation, (4) Preserves schema evolution capabilities, and (5) Optimizes encoding based on data characteristics.

The system's implementation of Avro's binary format delivers enhanced optimization through the following capabilities:

1. Storage Optimization: The system achieves maximum storage efficiency by employing specialized encoding techniques that significantly reduce data storage requirements beyond standard compression methods.
2. Performance Enhancement: The system implements optimized memory access patterns that accelerate both serialization and deserialization processes, crucial for maintaining high throughput in real-time data processing scenarios.
3. Schema Management: The system provides comprehensive schema evolution capabilities with built-in version management, ensuring seamless compatibility between different versions of data structures while maintaining backward compatibility.
4. Transformation Efficiency: The implementation minimizes transformation overhead through efficient buffer management and optimized data conversion routines.
5. Data Integrity: The system maintains data integrity through strategic validation checkpoints during both serialization and deserialization processes, ensuring reliability without compromising performance.

FIG. 4D illustrates an exemplary serialization process.

The data optimizer 304 compresses the serialized data using a compression algorithm.

Data compression reduces the size of serialized data, further optimizing storage utilization. A compression algorithm eliminates redundancy in the data, producing a smaller data footprint. The compression algorithm may include either (1) Gzip: A widely-used compression algorithm that provides good compression ratios but can be slower in terms of compression and decompression speed, or (2) Snappy: Developed by Google, Snappy is designed for speed rather than maximum compression. It offers faster compression and decompression speeds, making it suitable for real-time data processing systems.

FIG. 4E illustrates an exemplary compression process.

The data optimizer 204 stores the compressed data to a partition 306 associated with the Kafka topic.

Kafka stores data in topics, which are divided into partitions. Each partition is an ordered, immutable sequence of records that is continually appended to. The records in the partitions are distributed across the Kafka cluster for scalability and fault tolerance.

Storing compressed data in Kafka involves producing messages to a Kafka topic. The messages contain the compressed binary data, which is written to the appropriate partitions in the topic.

FIG. 4F illustrates an exemplary Kafka topic configuration.

This optimization process of the data optimizer 304 improves storage efficiency of the Kafka server 302.

Returning Data to a Consumer Process 310

The data optimizer 304 retrieves compressed data from a partition 310 associated with a Kafka topic.

Retrieving data from Kafka involves consuming messages from the Kafka topic. The consumed messages contain the compressed binary data, which needs to be decompressed before deserialization.

The data optimizer 304 decompresses the retrieved data. The data optimizer 304 deserializes the decompressed data using Avro, converting it back to its original format.

FIG. 4G illustrates an exemplary deserialization process.

The data optimizer 304 then reconstructs the original Avro format from the sparse data. Converting sparse data back to the Avro format involves filling in the missing null and default values as specified in the original schema. This ensures that the data retains its original structure and can be used for further processing or analysis. Data integrity is maintained by ensuring that the conversion process accurately reconstructs the original data structure, including all null and default values.

FIG. 4H illustrates an exemplary conversion process.

Finally, the data is successfully restored to its original form and is returned to the consumer process 310.

Handling Different Data Types

Handling different data types effectively may be one aspect of optimizing Kafka topic storage with sparse data structures and Avro serialization. The following description provides an in-depth explanation of how various data types, including scalars, enums, arrays, maps, unions, and nested records, are managed in both Avro and sparse data structures.

By handling these different data types effectively, the data optimizer 304 ensures that data stored in Kafka topics is optimized for both storage efficiency and performance. Each type, whether scalar, enum, array, map, union, or nested record, is carefully managed to include only non-null and non-default values, resulting in significant storage savings and improved data handling capabilities.

Scalars

Definition and Examples

Scalars are the simplest data types and include primitive types such as integers, floats, strings, and booleans. In Avro, scalars are straightforward to define and use.

Handling Scalars in Sparse Structures

In sparse data structures, scalars are stored only if they are non-null and non-default. This approach reduces the storage requirements by eliminating unnecessary data.

FIG. 4I illustrates an exemplary Avro schema definition for scalars.

Sparse Data Representation:

Original Data: {"userID": 123, "userName": "JohnDoe", "isActive": null}

Sparse Data: {"userID": 123, "userName": "JohnDoe"}

In this example, the isActive field is null and thus omitted in the sparse representation.

Enums

Definition and Examples

The system implements a specialized enumeration handling mechanism where each enum is defined through a type definition and an ordered set of symbols. This structured approach enables efficient storage optimization while maintaining semantic relationships.

The system utilizes a numeric index-based storage strategy for enum values, replacing string-based symbolic names with compact integer indices. This optimization provides: (1) Minimal storage footprint through fixed-width integer representation, (2) Direct bidirectional mapping between symbols and indices, (3) Schema-driven validation during transformations, (4) Efficient lookup performance during deserialization, and (5) Version compatibility management across schema evolution.

FIG. 4J illustrates an exemplary Avro schema definition for enums.

Sparse Data Representation:

Original Data: {"orderID": 101, "status": "PROCESSING"}

Sparse Data: {"orderID": 101, "status": 1}

Here, the enum value "PROCESSING" is stored as its index 1.

Arrays

Definition and Examples

Arrays are collections of items, all of the same type.

Handling Arrays in Avro and Sparse Structures

In Avro, arrays are defined with a type and an items field. In sparse structures, arrays are stored only if they are non-empty, further optimizing storage by omitting empty collections.

FIG. 4K illustrates an exemplary Avro schema definition for arrays.

Sparse Data Representation:

Original Data: {"userID": 456, "tags": [ ]}

Sparse Data: {"userID": 456}

In this example, the tags array is empty and thus omitted in the sparse representation.

Maps

Definition and Examples

Maps are collections of key-value pairs, where keys are strings, and values can be any Avro type. Maps are useful for representing associative arrays or dictionaries.

Handling Maps in Sparse Structures

In sparse structures, maps are stored only if they contain non-null and non-default values. This reduces storage by eliminating empty or redundant key-value pairs.

FIG. 4L illustrates an exemplary Avro schema definition for maps.

Sparse Data Representation:

Original Data: {"productID": 789, "attributes": {"color": "red", "size": null}}

Sparse Data: {"productID": 789, "attributes": {"color": "red"}}

In this case, the size attribute is null and omitted in the sparse representation.

Unions

Definition and Examples

Unions in Avro are used to represent a value that can be one of several types. Unions are defined as an array of types.

Handling Unions in Avro and Sparse Structures

In sparse structures, unions are stored by only including the active type and its value. This approach avoids storing unused types, optimizing the data representation.

FIG. 4M illustrates an exemplary Avro schema definition for unions.

Sparse Data Representation:

Original Data: {"eventID": 555, "eventData": "eventDescription"}

Sparse Data: {"eventID": 555, "eventData": "eventDescription"}

If eventData was null, it would be omitted in the sparse representation.

Nested Records

Definition and Examples

Nested records are records within records. They are defined by including a record type within another record's fields.

Handling Nested Records in Avro and Sparse Structures

Handling nested records in sparse structures involves recursively applying the sparse transformation to each nested record.

FIG. 4N illustrates an exemplary Avro schema definition for nested records.

Sparse Data Representation:

Original Data: {"userID": 123, "address": {"street": "Main St", "city": null}}

Sparse Data: {"userID": 123, "address": {"street": "Main St"}}

In this example, the city field is null and thus omitted in the sparse representation.

Exemplary Implementation

The example will use a simplified dataset, as shown in Table 1, representing customer billing events. This dataset includes various fields that are often null or have default values, making it an ideal candidate for sparse data optimization.

TABLE 1

| Customer ID | Service ID | Usage Amount | Billing Cycle | Charges | Discount | Remarks |
|---|---|---|---|---|---|---|
| 1001 | S101 | 500 | Q1-2024 | 100 | NULL | NULL |
| 1002 | S102 | 1500 | Q1-2024 | 300 | 50 | NULL |
| 1003 | NULL | NULL | Q1-2024 | NULL | NULL | No Usage |
| 1004 | S104 | 2000 | Q1-2024 | 400 | 20 | High Usage |
| 1005 | S105 | NULL | Q1-2024 | NULL | NULL | NULL |

In this dataset, several fields such as Discount and Remarks are often null.

The first step is to define an Avro schema that supports the given dataset. The schema allows for optional fields using union types, enabling flexible data representation.

FIG. 4O illustrates an exemplary Avro schema definition for the given dataset.

This schema defines each field and specifies null as an option for fields that can be absent.

Next, the data is converted into a sparse format by removing null and default values. This step significantly reduces the amount of data that needs to be stored. Table 2 illustrates the sparse data representation.

TABLE 2

| Customer ID | Service ID | Usage Amount | Billing Cycle | Charges | Discount | Remarks |
|---|---|---|---|---|---|---|
| 1001 | S101 | 500 | Q1-2024 | 100 | | |
| 1002 | S102 | 1500 | Q1-2024 | 300 | 50 | |
| 1003 | | | Q1-2024 | | | No Usage |
| 1004 | S104 | 2000 | Q1-2024 | 400 | 20 | High Usage |
| 1005 | S105 | | Q1-2024 | | | |

In this sparse format, empty fields indicate the omission of null or default values.

The sparse data is then serialized using Avro, converting it into a compact binary format. After serialization, a compression algorithm such as Gzip is applied to further reduce the data size. FIG. 4P illustrates an exemplary serialization process.

The binary data, once compressed, occupies significantly less storage space.

The compressed data is stored in Kafka topics. Kafka's efficient storage mechanism ensures that the data is durably stored and easily retrievable.

FIG. 4Q illustrates an exemplary Kafka topic configuration.

Kafka topics are configured to balance the load and ensure data redundancy.

When the data is needed, it is retrieved from Kafka, decompressed, and deserialized back into its original format. The decompressed data is then converted back from sparse to Avro format.

FIG. 4R illustrates an exemplary deserialization process.

The data is restored to its original form, ensuring data integrity and usability.

The final step involves converting the sparse data back to its original Avro format. This ensures that all necessary fields are included, even if they are null or default values.

Sparse to Avro Conversion Example:

Sparse Data: {"CustomerID": 1001, "ServiceID": "S101", "UsageAmount": 500, "BillingCycle": "Q1-2024", "Charges": 100}

Avro Data: {"CustomerID": 1001, "ServiceID": "S101", "UsageAmount": 500, "BillingCycle": "Q1-2024", "Charges": 100, "Discount": null, "Remarks": null}

By following these detailed steps, the exemplary implementation demonstrates the effectiveness of the proposed solution in optimizing Kafka topic storage. Each phase, from schema definition and sparse data conversion to serialization, compression, storage, and retrieval, may achieve significant storage savings and may enhance data processing efficiency.

SUMMARY

The embodiments described herein can provide:

Storage Efficiency

Using sparse data structures can provide significant reduction in storage requirements. Traditional storage methods store all fields of a message, including those that are null or default, leading to substantial storage overhead. Sparse data structures, however, only store fields that contain actual data.

Example: Consider a dataset where 60% of the fields are null or default. Using traditional methods, all fields would be stored, resulting in 100% storage usage. By contrast, using sparse data structures, only the 40% of fields with actual data are stored, potentially reducing storage requirements by up to 60%.

This efficiency is further enhanced by Avro serialization, which converts the data into a compact binary format, and by compression algorithms like Gzip or Snappy, which further reduce the data size.

Cost Savings

Reducing the storage size directly translates to cost savings, especially in cloud environments where storage costs are a significant portion of the operational expenses. By minimizing the amount of data stored, companies can lower their storage costs and make more efficient use of their resources.

Cost Savings Example: If a company currently spends $10,000 per month on storage, a 60% reduction in storage usage could save up to $6,000 per month. This is a substantial saving that can be reinvested into other areas of the business.

Improved Performance

Smaller data sizes result in faster data transmission and retrieval times. This performance improvement is crucial for real-time data processing systems that rely on low latency and high throughput.

Performance Metrics:

Data Transmission: Reduced data size means less bandwidth usage and faster transmission times.

Data Retrieval: Smaller datasets can be retrieved more quickly, reducing the time required for data access and processing.

These performance improvements can enhance the responsiveness and efficiency of data-driven applications, providing a better user experience and more timely insights.

Scalability

The optimization described herein is highly scalable, supporting flexible data representations and adapting to different data structures. This scalability is essential for handling the growing data volumes that companies face.

Scalability Example: As the volume of data increases, the benefits of using sparse data structures and Avro serialization become even more pronounced. The ability to efficiently store and process larger datasets without a corresponding increase in storage costs or performance degradation is a key advantage.

Enhanced Data Integrity

Ensuring data integrity is crucial during the processes of compression, storage, and retrieval. The proposed method maintains data integrity by preserving the original data structure and values, even when converting between sparse and Avro formats.

Data Integrity Measures:

Avro Schema Validation: Ensures that data conforms to the defined schema, preventing data corruption.

Lossless Compression: Algorithms like Gzip and Snappy compress data without loss, preserving the original data values.

Consistent Serialization/Deserialization: The use of Avro for both serialization and deserialization ensures that data remains consistent and accurate throughout the process.

Real-World Impact

Implementing the optimization disclosed herein in real-world scenarios showcases its practical benefits. For example, by processing millions of billing events daily, the system can achieve significant storage savings and performance improvements.

Real-World Example:

Scenario: a Charging Function (CHF) application reads events from the Session Management Function (SMF) and places them into the cdr-json topic for further rating, charging, and billing.

Using sparse data structures and Avro serialization, the cdr-json topic will contain more efficient and compact messages, reducing storage requirements, costs, and improving processing performance.

Figure 5:
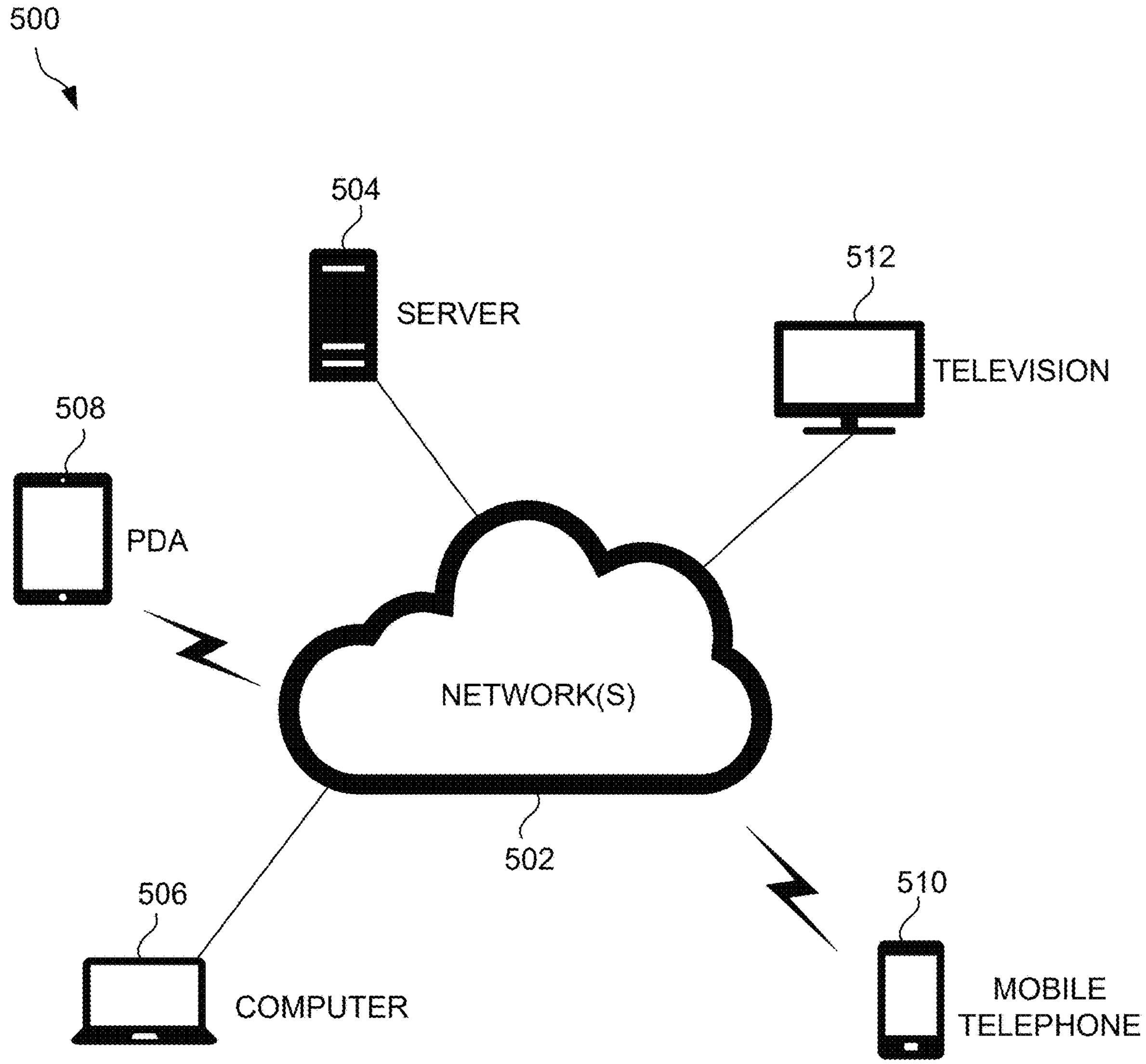
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
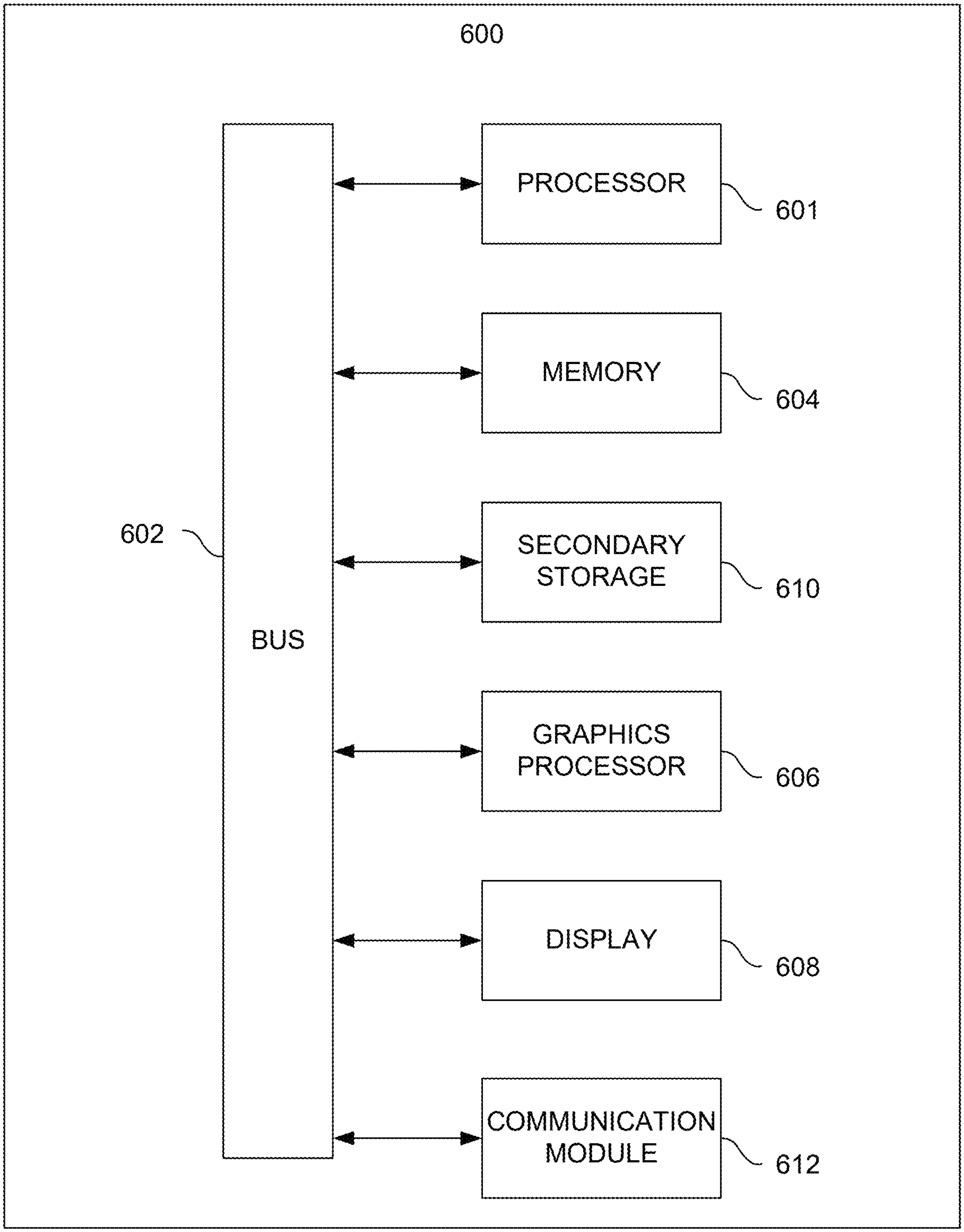
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

receive, by a Kafka server from a producer process, raw data to be published to a specified Kafka topic, wherein the raw data includes null values and default values;

define, by the Kafka server, a schema of the raw data, the schema defining a plurality of fields of each record in the raw data, wherein a first field of the plurality of fields is configured to store the null values and wherein a second field of the plurality of fields is configured to store the default values;

generate, by the Kafka server based on the schema of the raw data, a sparse data structure configured to include the plurality of fields without the first field and the second field for use in storing the raw data without the null values and default values;

store, by the Kafka server, a bidirectional mapping between the sparse data structure and a defined binary format;

responsive to receipt of the raw data, optimize the raw data, by the Kafka server, by:

storing, by the Kafka server, the raw data as sparse data by storing the raw data in the sparse data structure without the null values and the default values, serializing, by an encoder of the Kafka server, the sparse data stored in the sparse data structure to generate a binary representation of the sparse data in the defined binary format, wherein the encoder employs the bidirectional mapping between the sparse data structure and the defined binary format to serialize the sparse data to generate the binary representation of the sparse data, and compressing, by the Kafka server, the binary representation of the sparse data to generate a compressed representation of the sparse data that eliminates redundancy in the binary representation of the sparse data, wherein for a first set of data values in the raw data that are of an enum data type, the optimizing further includes replacing string-based symbolic names in the first set of data values with fixed-width integer indices for numeric index-based storage, wherein the replacing is performed in accordance with a second bidirectional mapping between symbols and indices, wherein for a second set of data values in the raw data that are of an array data type, the optimizing further includes storing the second set of data values as the sparse data by omitting empty arrays from storage in the sparse data structure, wherein for a third set of data values in the raw data that are of a key-value pair data type, the optimizing further includes storing the third set of data values as the sparse data by eliminating empty key-value pairs and redundant key-value pairs from storage in the sparse data structure, wherein for a fourth set of data values in the raw data that are of a union data type representative of several data types, the optimizing further includes storing the fourth set of data values as the sparse data by only including in the sparse data an active data type and its value such that unused data types are prevented from being stored in the sparse data structure, and wherein for a fifth set of data values in the raw data that are of a nested data type representing nested records, the optimizing further includes recursively storing the raw data in each of the nested records as the sparse data; and store, by the Kafka server, a message containing the compressed representation of the sparse data to a partition associated with the specified Kafka topic.

2. The non-transitory computer-readable media of claim 1, wherein the data includes a stream of data records.

3. The non-transitory computer-readable media of claim 1, wherein serializing the sparse data includes converting the sparse data structure into a compact binary format.

4. The non-transitory computer-readable media of claim 1, wherein the sparse data is serialized using a serialization library which processes the sparse data and a defined schema to generate the binary representation of the data.

5. The non-transitory computer-readable media of claim 1, wherein the binary representation is compressed using a predefined compression algorithm.

6. A method, comprising:

at a computer system:

receiving, by a Kafka server from a producer process, raw data to be published to a specified Kafka topic, wherein the raw data includes null values and default values;

defining, by the Kafka server, a schema of the raw data, the schema defining a plurality of fields of each record in the raw data, wherein a first field of the plurality of fields is configured to store the null values and wherein a second field of the plurality of fields is configured to store the default values;

generating, by the Kafka server based on the schema of the raw data, a sparse data structure configured to include the plurality of fields without the first field and the second field for use in storing the raw data without the null values and default values;

storing, by the Kafka server, a bidirectional mapping between the sparse data structure and a defined binary format;

responsive to receipt of the raw data, optimizing the raw data, by the Kafka server, by:

storing, by the Kafka server, the raw data as sparse data by storing the raw data in the sparse data structure without the null values and the default values, serializing, by an encoder of the Kafka server, the sparse data stored in the sparse data structure to generate a binary representation of the sparse data in the defined binary format, wherein the encoder employs the bidirectional mapping between the sparse data structure and the defined binary format to serialize the sparse data to generate the binary representation of the sparse data, and compressing, by the Kafka server, the binary representation of the sparse data to generate a compressed representation of the sparse data that eliminates redundancy in the binary representation of the sparse data, wherein for a first set of data values in the raw data that are of an enum data type, the optimizing further includes replacing string-based symbolic names in the first set of data values with fixed-width integer indices for numeric index-based storage, wherein the replacing is performed in accordance with a second bidirectional mapping between symbols and indices, wherein for a second set of data values in the raw data that are of an array data type, the optimizing further includes storing the second set of data values as the sparse data by omitting empty arrays from storage in the sparse data structure, wherein for a third set of data values in the raw data that are of a key-value pair data type, the optimizing further includes storing the third set of data values as the sparse data by eliminating empty key-value pairs and redundant key-value pairs from storage in the sparse data structure, wherein for a fourth set of data values in the raw data that are of a union data type representative of several data types, the optimizing further includes storing the fourth set of data values as the sparse data by only including in the sparse data an active data type and its value such that unused data types are prevented from being stored in the sparse data structure, and wherein for a fifth set of data values in the raw data that are of a nested data type representing nested records, the optimizing further includes recursively storing the raw data in each of the nested records as the sparse data; and storing, by the Kafka server, a message containing the compressed representation of the sparse data to a partition associated with the specified Kafka topic.

* * * * *